US006481769B2

(12) United States Patent
Harris et al.

(10) Patent No.: US 6,481,769 B2
(45) Date of Patent: Nov. 19, 2002

(54) MULTIPLE BUILDING BLOCK LIFTING DEVICE

(76) Inventors: Loren D. Harris, 17311 - 157th Ave. SE., Snohomish, WA (US) 98290; David B. Harris, 12327 - Roosevelt Rd., Snohomish, WA (US) 98290; Brett A. Harris, 16301 - 107th Ave. NE., Bothell, WA (US) 98011

( * ) Notice: Subject to any disclaimer, the term of this patent is extended or adjusted under 35 U.S.C. 154(b) by 0 days.

(21) Appl. No.: 10/035,512

(22) Filed: Oct. 19, 2001

(65) Prior Publication Data

US 2002/0085906 A1 Jul. 4, 2002

Related U.S. Application Data

(60) Provisional application No. 60/242,129, filed on Oct. 20, 2000.

(51) Int. Cl.[7] .......................... B65G 57/22; B66C 13/08

(52) U.S. Cl. ..................... 294/62; 294/81.4; 294/81.61; 294/87.1; 294/88; 294/89; 294/104

(58) Field of Search .......................... 294/62, 63.1, 65, 294/67.1, 67.5, 81.1, 81.3–81.5, 81.6–81.62, 86.41, 87.1, 88, 89, 93–97, 104; 52/125.1–125.6, 126.1; 414/10, 783

(56) References Cited

U.S. PATENT DOCUMENTS

| | | | | | |
|---|---|---|---|---|---|
| 2,564,357 | A | * | 8/1951 | Falkner | 294/62 |
| 2,574,131 | A | * | 11/1951 | Steinbrecher | 294/62 X |
| 3,544,151 | A | * | 12/1970 | Stokes | 294/81.6 |
| 3,939,993 | A | * | 2/1976 | Lingl | 294/81.4 X |
| 3,972,553 | A | * | 8/1976 | Johnston | 294/81.5 X |
| 4,228,993 | A | * | 10/1980 | Cathers | 294/65 X |
| 4,401,336 | A | * | 8/1983 | Matthews | 294/94 |
| 4,474,400 | A | | 10/1984 | Toffolon | 294/97 |
| 4,969,789 | A | * | 11/1990 | Searle | 294/81.61 X |
| 5,490,702 | A | | 2/1996 | Fleming | 294/97 |
| 5,704,675 | A | | 1/1998 | Reiley | 294/95 |
| 5,797,638 | A | | 8/1998 | Yamazaki et al. | 294/97 |

* cited by examiner

*Primary Examiner*—Johnny D. Cherry
(74) *Attorney, Agent, or Firm*—Dean A. Craine

(57) ABSTRACT

A lifting device that simultaneously lifts a plurality of retaining wall blocks initially oriented in a triangular configuration on a pallet and allows them to be easily realigned in a linear configuration on a retaining wall. The lifting device comprises two pivoting lateral extending side arms with clamping units attached to their distal ends. Attached to the main planar frame is a central clamping unit. Each clamping unit includes an insert member that inserts into a large, vertically aligned hole formed in the block. When the clamping units are inserted into the hole and activated, three triangularly aligned sets of blocks on a pallet may be lifted. The side arms are designed to pivot rearward so that the front surfaces of the blocks are longitudinally aligned and the blocks are positioned in a side-by-side manner. Once properly realigned, the lifting device is lowered so that the three blocks are simultaneously placed over the top row of the retaining wall. The gripping members are then relaxed so that the blocks are released. The side arms then automatically align in their original positions so that they may be used to connect to another set of triangularly aligned blocks on the pallet.

20 Claims, 7 Drawing Sheets

MULTIPLE BUILDING BLOCK LIFTING DEVICE

This is a utility patent application based on a provisional patent application (Serial No. 60/242,129) filed on Oct. 20, 2000.

BACKGROUND OF THE INVENTION

1. Field of the Invention

This invention pertains to devices used to lift concrete building or retaining wall blocks in position on a wall, and more particularly, to such devices that enable the blocks to be lifted directly from their pallets and easily repositioned for placement on the wall.

2. Description of the Related Art

Lifting devices that are attachable to backhoes to help construction workers more efficiently set concrete blocks in place on building or retaining walls are widely known. These devices eliminate the need for workers to individually lift and position the heavy concrete blocks, saving time, physical energy, and labor cost. Unfortunately, such devices are able to lift and position only one concrete block at a time, which makes wall building a slow, tedious process.

Retaining wall blocks are shipped from the manufacturer on pallets. Typically, the concrete blocks are stacked in layers on the pallet 97 five to six blocks high with the concrete blocks 12, 12,', 12" in each layer being arranged side-by-side in two, opposite aligned triangular configurations, as shown in FIG. 3. Because each block has one or two centrally located holes 91, 92, formed therein and typically weighs approximately 120 lbs, heavy equipment, such as a tractor or backhoe, is normally used to individually lift each concrete block from the pallet and then rotate it for proper placement on the wall.

In order to expedite the process and reduce labor and equipment rental costs, what is needed is a lifting device that can easily and securely attach to a plurality of concrete blocks on a pallet, rotate them for proper placement on a wall, and then easily release them directly off the shipment pallet.

SUMMARY OF THE INVENTION

It is an object of the present invention to provide a device that easily and securely lifts a plurality of concrete blocks using common construction lifting equipment, such as a tractor, backhoe or forklift.

It is another object of the present invention to provide such a device that lifts the concrete blocks in the original positions on a shipping pallet.

It is a further object of the invention to provide such a device that allows the user to readjust the relative positions of the lifted concrete blocks for proper alignment on a wall.

These and other objects of the invention which will become apparent are met by the lifting device disclosed herein that includes a main clamping member that selectively attaches to one concrete block on the pallet and at least one movable side clamping member that selectively attaches to a second concrete block located on the same layer of concrete blocks on the pallet. After both clamping members are attached to the concrete blocks, the lifting device is lifted by suitable lifting equipment until they clear other remaining concrete blocks on the pallet. The side clamping member is then moved relative to the main clamping member so that the two concrete blocks are aligned side by side so that the front faces of the blocks are longitudinally aligned for placement on a straight or slightly curved wall. When the concrete blocks are lifted and properly positioned over the wall, the lifting device is lowered until the concrete blocks are positioned above the desired locations and then selectively released from the main and side clamping members. The lifting device is then returned to the pallet to pick up other concrete blocks.

In the preferred embodiment, the lifting device is designed to lift three concrete blocks located in one layer and oriented in the same direction and in a triangular configuration, as shown in FIG. 3. The lifting device includes one fixed main clamping member and two rotating side clamping members mounted on the ends of two pivoting arms. The relative locations of the main clamping member and the two side clamping members, and the length of the two arms are sufficient so that triangularly configured concrete blocks located in a layer on a pallet may be engaged and lifted. During operation, each arm is selectively pivoted from a forward, laterally extended position to a rearward, laterally extended position. When the arms are aligned in a forward laterally extended position, the three clamping members may attach to three concrete blocks aligned in a triangular configuration on the pallet. When the arms are lifted and pivoted into a rearward, laterally extended position, the side clamping members are automatically rotated so that the front faces of the blocks are side by side and linearly configured. The blocks are then longitudinally aligned for immediate placement on a wall. Each side arm includes a linking arm that connects each side clamping member with the main frame member so that when the arm is pivoted, the side clamping member automatically rotates thereby keeping the side clamping member and main clamping member facing the same direction.

The lifting device also includes an eye bolt or hook connected to the main frame member which connects to a chain or cable attached to a backhoe or forklift which is used to lift the lifting device and position the blocks on the wall.

In one embodiment, movement of the arms and control of the main and side clamping members are simultaneously coordinated and controlled by a hydraulic control system that connects to the hydraulic system used on the backhoe or tractor. In another embodiment, no control system is provided so that the movements of the arms are manually controlled and the blocks are automatically engaged whenever the clamping members are inserted into one of the holes on the blocks and an upward lifting force is applied thereto. A manual lever is then used to temporarily disengage the clamping members from the blocks so that the lifting device may be lifted away.

The lifting device includes an optional arc adjustment means that enables the user to selectively adjust the amount of rotation of each arm relative to the main clamping member so that the device may be used with different sized concrete blocks originally positioned in a triangular configuration on a pallet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

DESCRIPTION OF THE PREFERRED EMBODIMENT(S)

Figure 1:
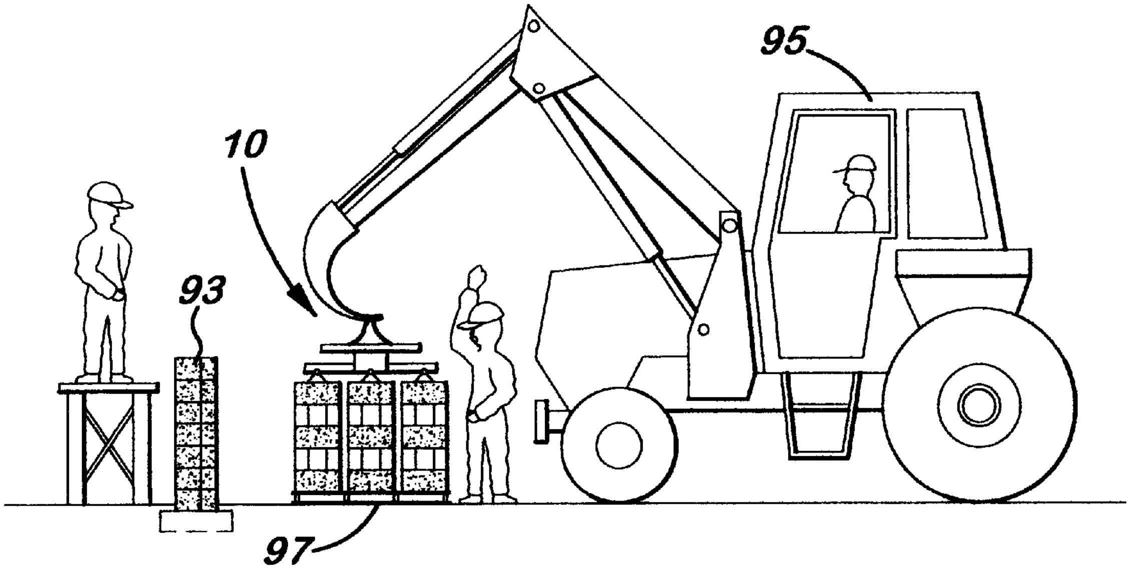
FIG. 1 is a side elevation view of workers using the device attached to a tractor to lift blocks on a pallet.
Figure 2:
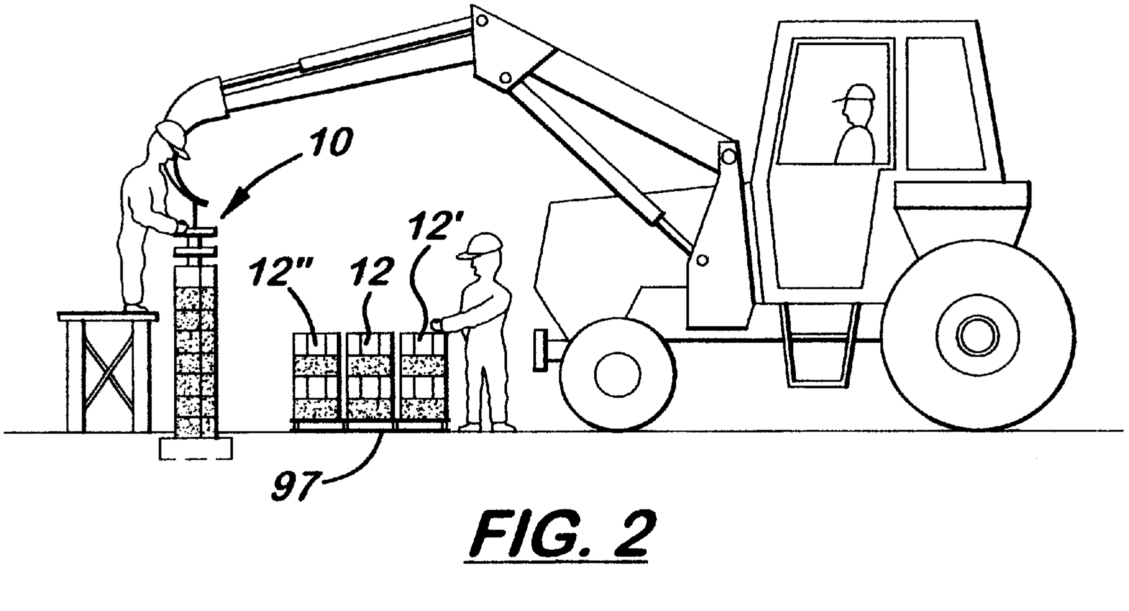
FIG. 2 is a side elevational view similar to FIG. 1 showing the device being used to lift blocks to the wall.
Figure 3:
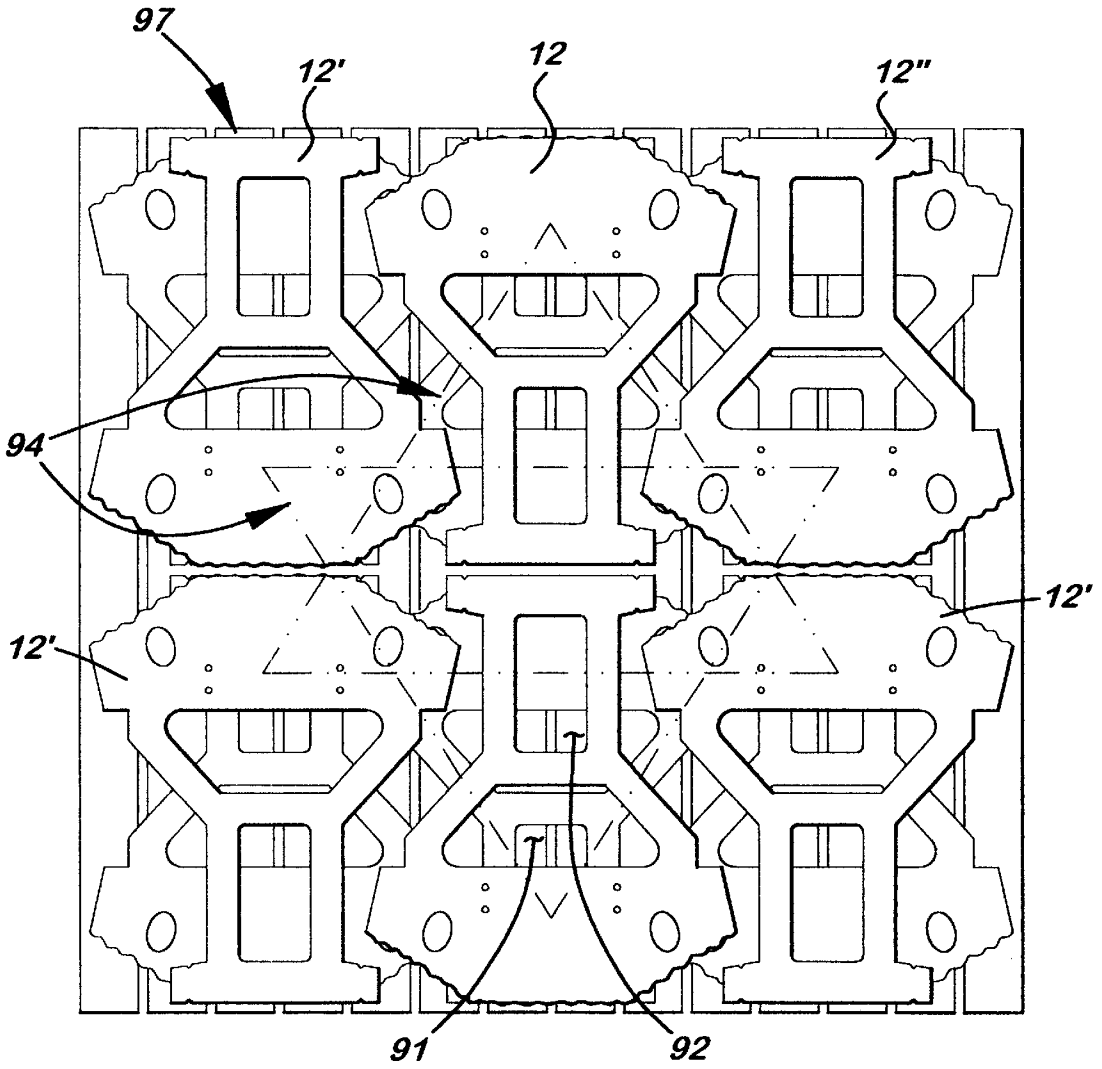
FIG. 3 is a top plan view of six blocks in a layer of blocks on a pallet.
Figure 4:
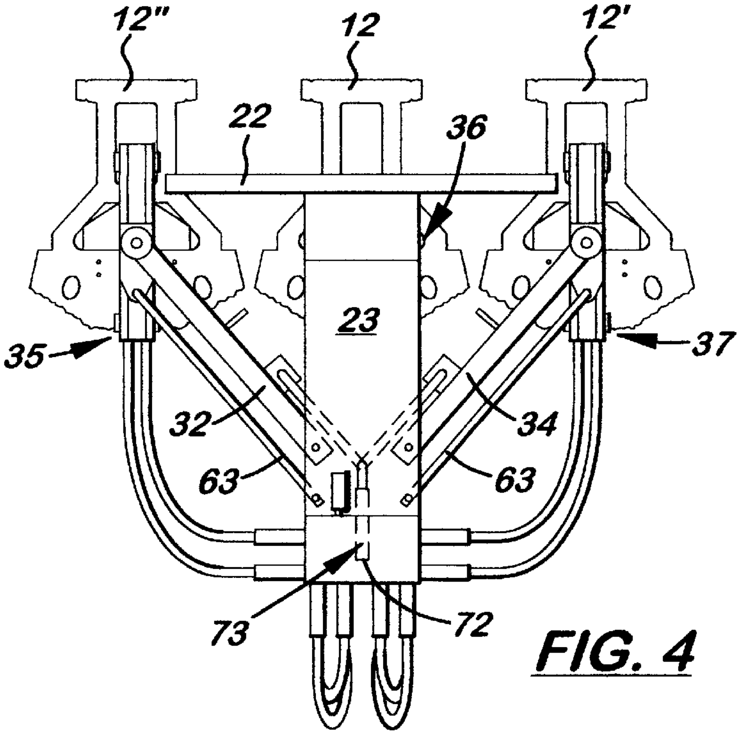
FIG. 4 is a top plan view of the invention showing the device being used to longitudinally align the faces of three blocks.
Figure 5:
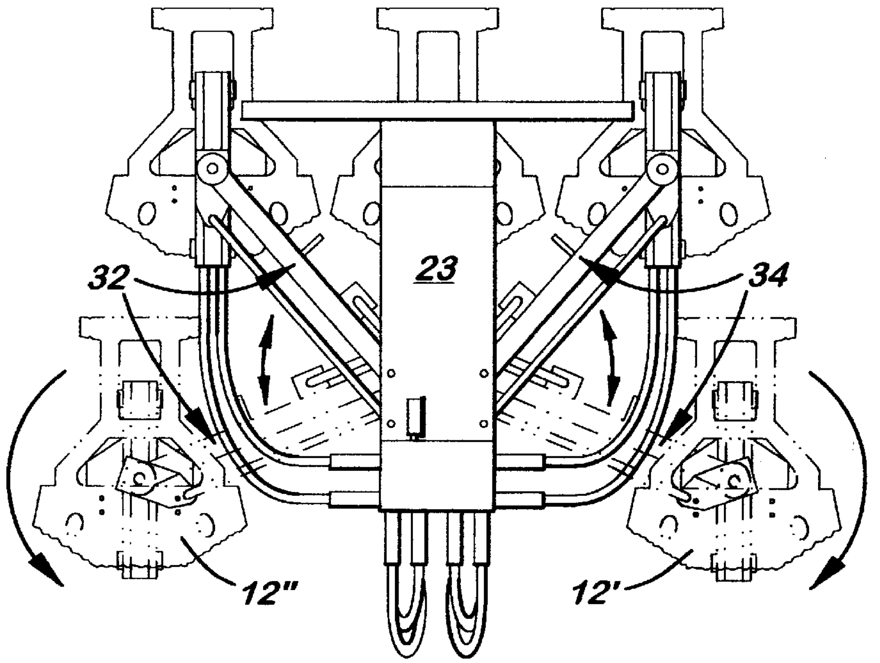
FIG. 5 is a top plan view of the device showing the arms being rotated to initially connect to the blocks.
Figure 6:
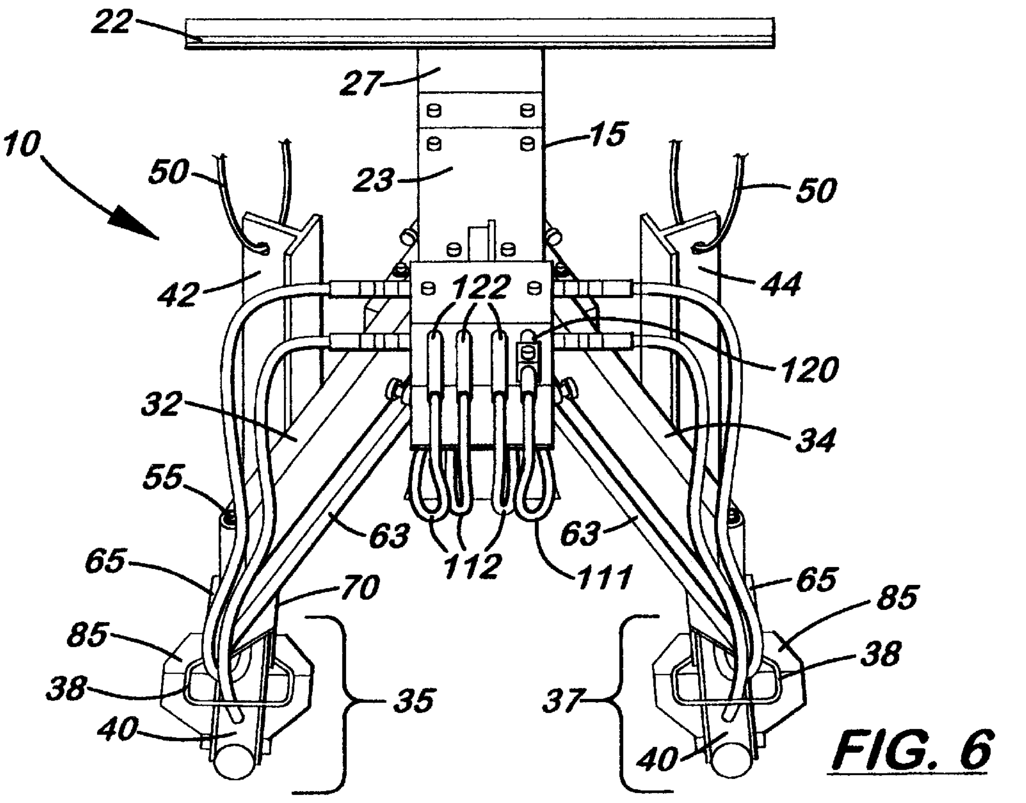
FIG. 6 is a rear perspective view of the invention.

Referring to the accompanying Figs., there is shown and described a lifting device 10 used for placing three concrete blocks 12, 12', 12" originally aligned in a triangular configuration by a block manufacturer on a pallet 97 directly onto a wall 93 as shown in FIGS. 1 and 2 using lifting machinery 95. A plurality of concrete blocks is normally stacked in layers on a pallet 97. Typically, each layer is made of six blocks divided into two groups aligned in a triangular configuration, indicated by the reference number 94, and oriented in opposite directions, as shown in FIG. 3. In order to place the concrete blocks 12, 12', 12" in a group directly onto a wall 93, they must be lifted and repositioned in a linear configuration as shown in FIG. 4. When lifting the second set of blocks, all of the concrete blocks must also be rotated 180 degrees so that they face the same direction, as shown in FIG. 5.

As shown in FIGS. 6–11, the lifting device 10 includes a main frame member 15 made up of an upper horizontal plate 23 and a lower horizontal plate 25. Attached to the distal end of the upper horizontal plate 23 and extending thereabove is an optional horizontal bar 22 which is used for manually carrying the lifting device 10. The horizontal bar 22 is connected to the distal end of the upper horizontal plate 23 by a vertical bracket 27.

Figure 7:
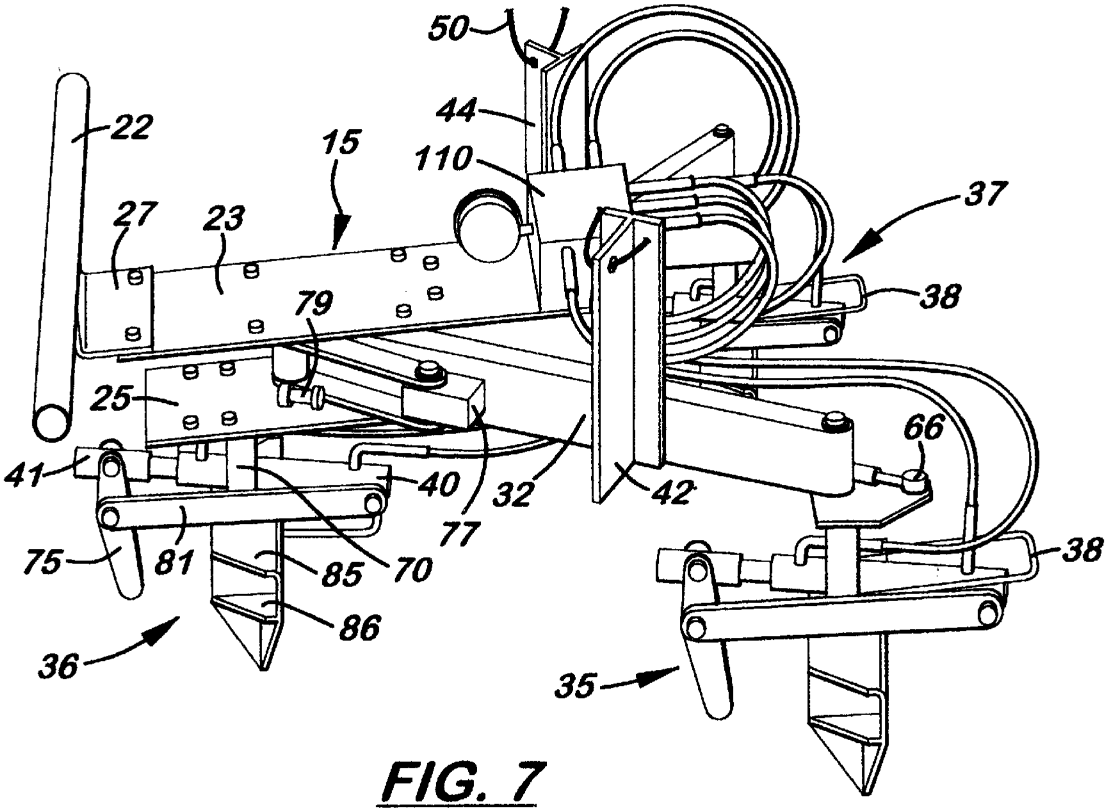
FIG. 7 is a side perspective view of the invention.
Figure 8:
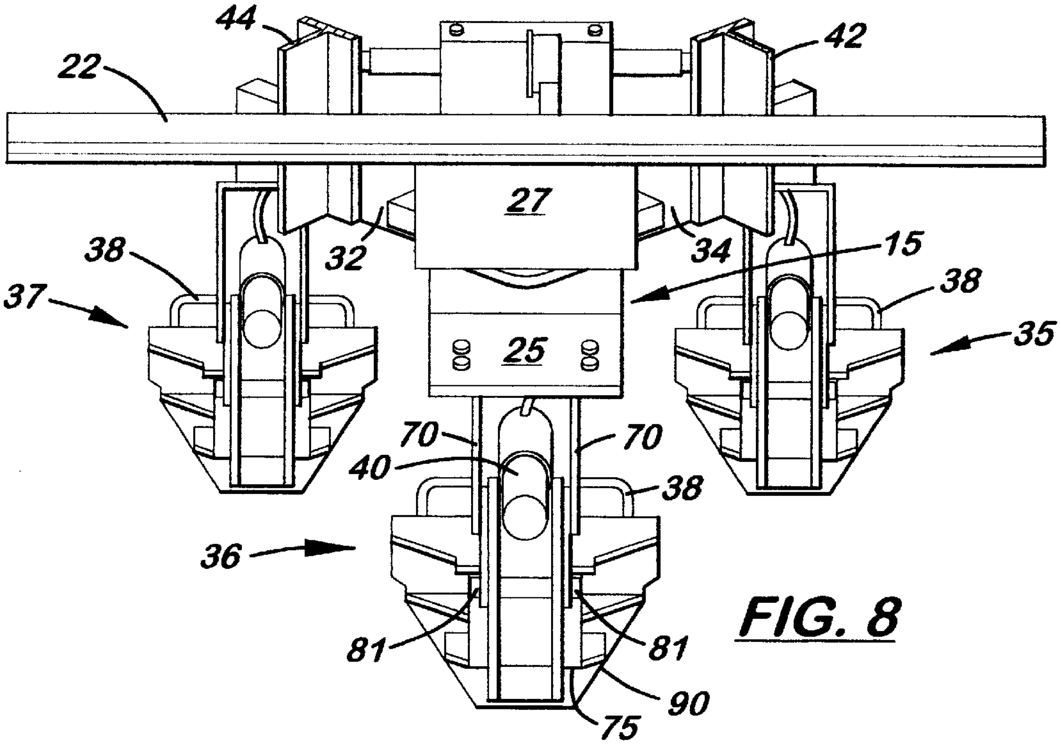
FIG. 8 is a front perspective view of the invention.
Figure 9:
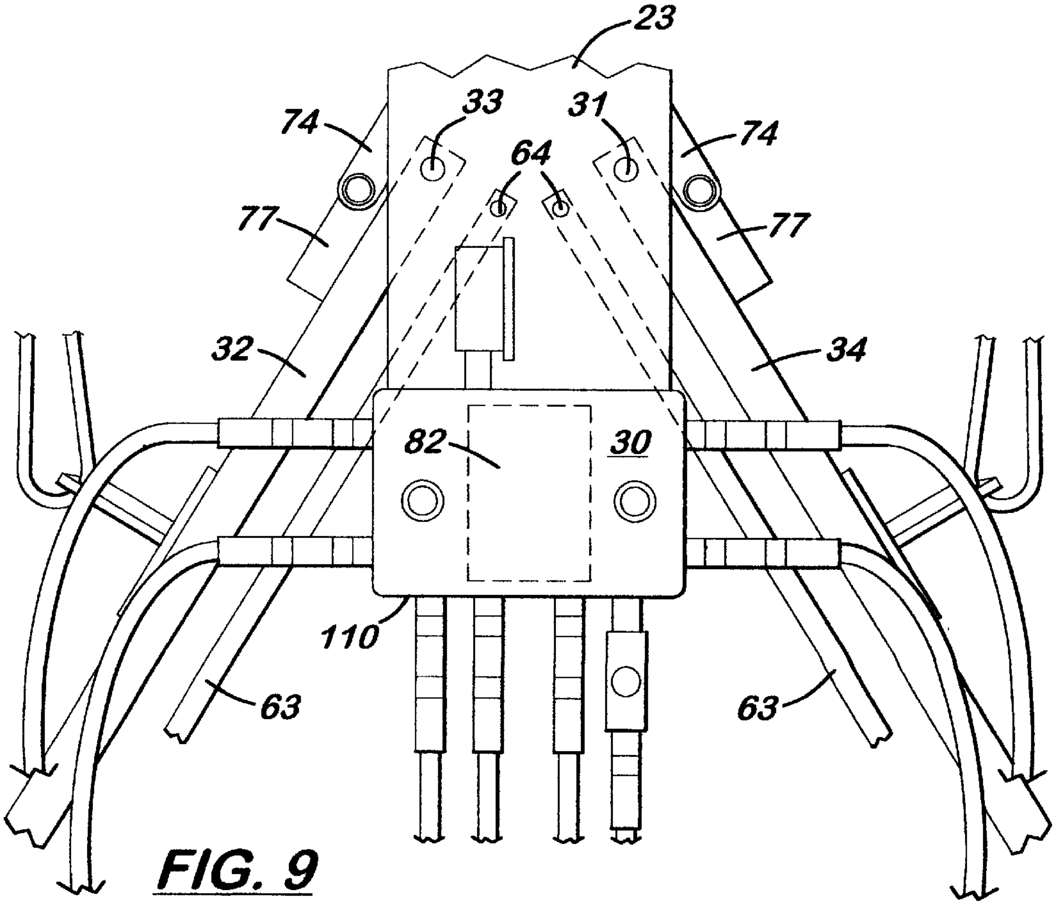
FIG. 9 is a partial, top plan view of the main frame member.
Figure 10:
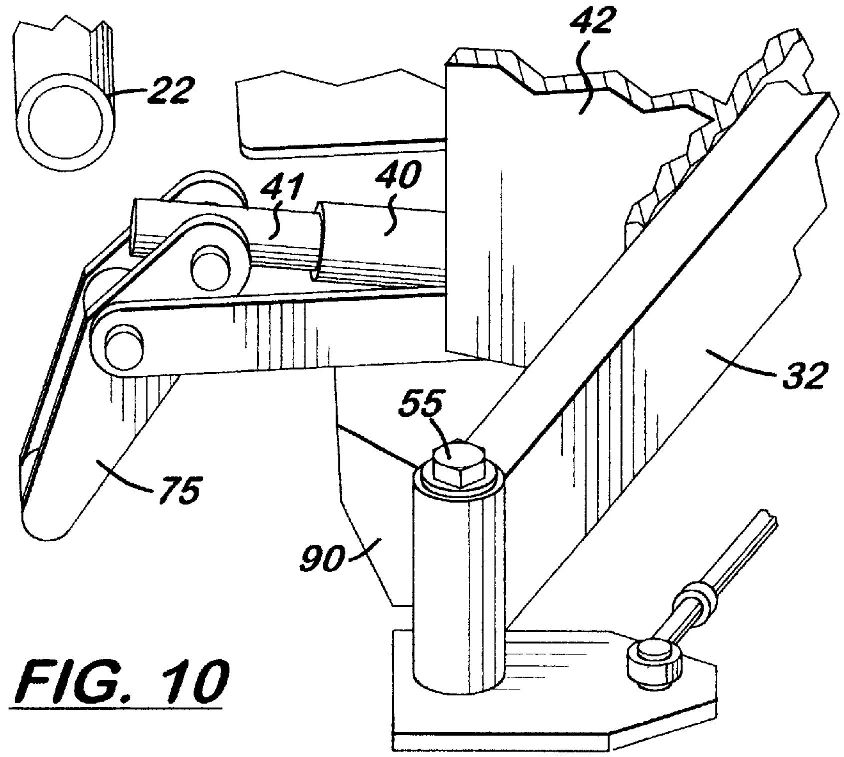
FIG. 10 is a partial, side perspective view of the central clamping member.

As shown in FIGS. 7–8, attached to the lower surface of the lower horizontal plate 25 near the distal end of the main frame member 15 is a fixed main clamping member 36. The main clamping member 36 includes a pair of downward extending support brackets 70 welded at their upper ends to the bottom surface of the lower horizontal plate 25. The lower ends of the two support brackets 70 are welded to the top surface of a downward extended insert member 85. More specifically, the insert member 85 includes a front support surface 86 and a downward extending tongue member 90. The tongue member 90 is conical and designed to fit into a centrally located oblong or rectangular hole 91, 92, respectively, formed on a block 12, 12', 12", as shown in FIG. 3. disposed over the top surface of the insert member 85 are two parallel, horizontally aligned bars 81. The first ends of the two bars 81 are attached to the stationery end of a horizontally disposed hydraulic cylinder 40. The second ends of the two bars 81 are pivotally attached to a pivoting clamp member 75. The upper end of the clamp member 75 is attached to the opposite end of the plunger 41 on the hydraulic cylinder 40.

Pivotally attached on opposite sides of the central axis of the main frame member 15 are two laterally extending arms 32, 34. In the preferred embodiment, the arms 32, 34 are made of square tubular material connected at their proximal ends to bolts 31, 33, respectively, that extend vertically between the upper and lower plates 23, 25, respectively. (See FIG. 9.) The bolts 31, 33 are positioned on the main frame member 15 directly opposite from each other so that the arms 32, 34 pivot in approximately 70 degree arcs over the opposite sides of the main frame member 15.

The two side clamping members 35, 37 are substantially identical to the main clamping member 36 except that they are designed to rotate on the ends of the side arms 32, 34. Located on the distal end of each arm 31, 32 is a vertically aligned rotating bolt 55 that connects to a horizontally aligned attachment plate 65. Extending downward from the attachment plate 65 are two parallel, short support brackets 70 identical to those used with clamping member 36. During operation, the insert member 85 on each clamping member 35, 36, 37 is placed into a central hole 91, 92 formed on three blocks 12, 12', 12". The plunger 41 on the cylinder 40 is moved inward and outward to cause each insert member 85 to press against and release the front surface of a block 12, 12", 12", respectively. When the plunger 41 is pressed against the front surface, the blocks 12, 12', 12"are securely attached and may be lifted into position on the wall 93.

As noted above, the attachment plates 65 are designed to rotate freely 360 degrees over the distal end of the arms 32, 34. Rotational movement of each attachment plate 65 is controlled by a linking rod 63 that extends between the main frame member 15 and the attachment plate 65. The linking rods 63 are aligned parallel to the inside surface of the side arms 32, 34 with their opposite ends pivotally attached via bolts 64, 66 to the lower horizontal plate and the attachment plate 65, respectively. The bolts 64, 66 are positioned on the lower horizontal plate 25 and the attachment plate 65 so that the linking rod 63 and side arm 32, 35 are parallel when the side arm 32, 34 pivots.

In the preferred embodiment, pivotal movement of the side arms 32, 34 and rotational movement of the two side clamping members 35, 37 is controlled by a hydraulic system comprising four interconnected hydraulic cylinders—one hydraulic cylinder 40 coupled to each main and side clamping member 35, 36, 37, respectively, and one central hydraulic cylinder 72 located on the main frame member 15. The central hydraulic cylinder 72 is used to selectively rotate the side arms 32, 34 between a forward extended position and a rearward extended position.

Figure 11:
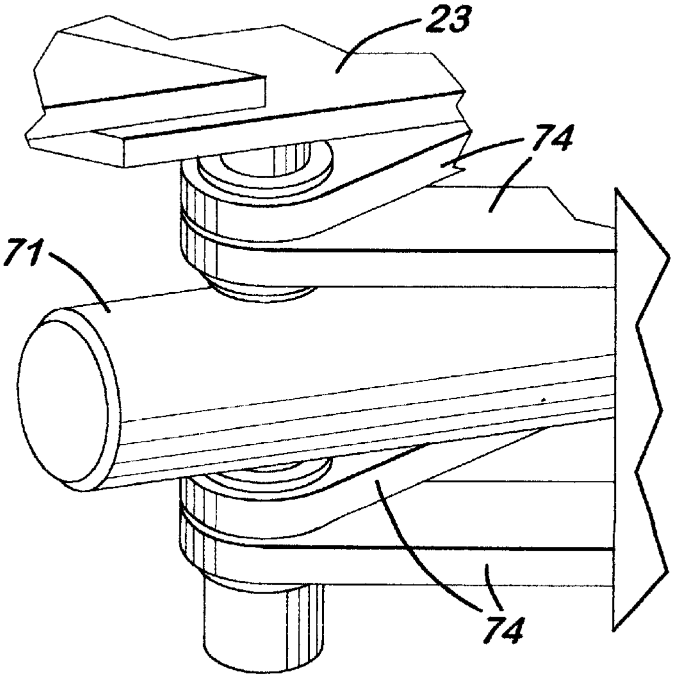
FIG. 11 is a partial, side perspective view of the pivoting joint for the arm.

Located on the opposite side of each side arm 32 or 34 from the linking rod 63 is a pair of guide arms 74. The distal end of the guide arms 74 are attached to a flange surface 77 that extends outward from the side arm. The flange surface 77, which is located approximately ⅓ the length of the side arm 32, 34, acts as an attachment surface for the guide arms 74 but also as a stop surface for an adjustable stop bolt 79 attached to the main frame member 15. During initial setup, the stop bolt 79 is adjusted so that the movement of the side arm 32, 34 matches the exact location of the blocks 12, 12', 12" on a pallet 97. The opposite ends of the guide arms 74 are coupled via linkage (not shown) to the plunger 71 on the central hydraulic cylinder 72 as shown in FIG. 11. As discussed further below, the central hydraulic cylinder 72 may be eliminated. When this is done, the ends of the two guides arms 74 on opposite side arms 32, 34 may be connected together so that the movement of the side arms 32, 34 are coupled together. The distal end 73 of the hydraulic cylinder 72 is attached to a vertically aligned pin (not shown) disposed between the upper and lower horizontal plates 23, 25, respectively.

All of the cylinders 40, 72 are connected together by a control valve 82 located in a control box 110 located on the distal end of the upper horizontal plate 23. Main input and output lines 111, 112, respectively, from the heavy equipment connect to suitable ports 120, 122, respectively, on the control box 110 which simultaneously control movement of the side arms 32, 34 and movement of the clamping members, 35, 36, 37.

Each arm 32, 34 includes an upward extending lifting bracket 42, 44, respectively, to which a chain or cable 50 attaches. The lifting brackets 42, 44 are mounted in balanced locations on the side arms 32, 34 so that the blocks are remain horizontally aligned when attached to the lifting device 10. During use, the end of the chain or cable 50 is connected to lifting machinery 95 which lifts the device 10 and allows for the device 10 to place the blocks 12, 12', 12" where needed. Also located on the main frame member 15 and the ends of both side arms 32, 34 is an optional handle 38 which is used by the operator to guide the lifting device 10 in place over the blocks 12, 12', 12" or wall 93.

Figure 12:
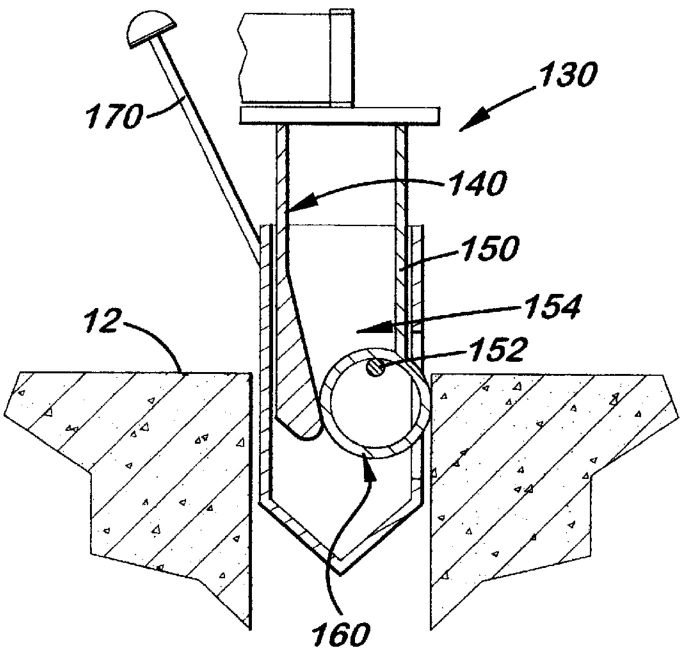
FIG. 12 is a sectional, side elevational view of a second embodiment of the insert member showing the insert member automatically engaging a block when inserted into the hole.
Figure 13:
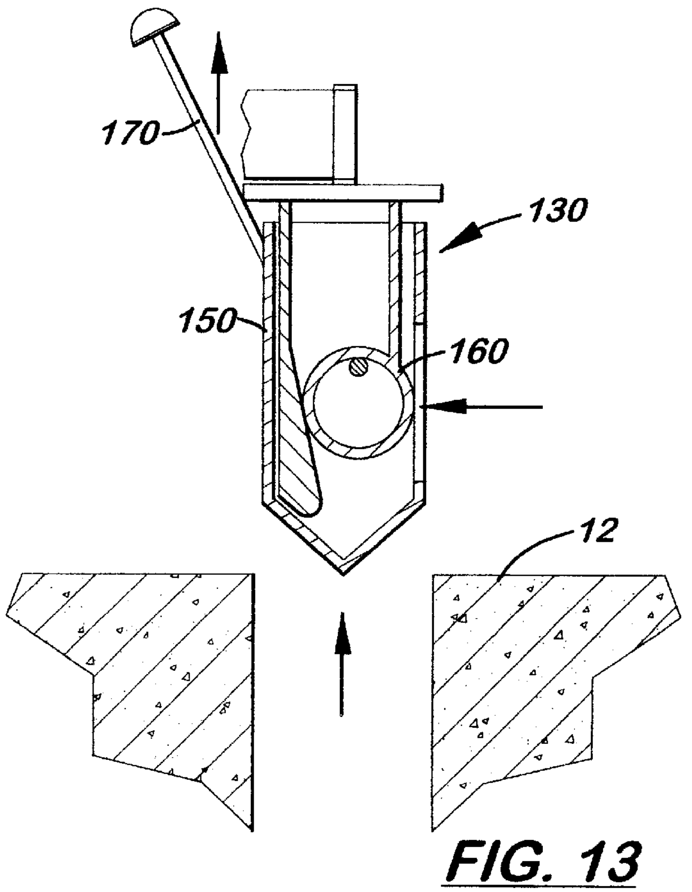
FIG. 13 is a sectional side elevational view similar to the view shown in FIG. 12 where the outer sleeve is being lifted so that the engaging element moves inward to disengage from the block.

As mentioned above, each arm 32, 34 is connected to a central hydraulic cylinder 72 disposed longitudinally between the upper and lower horizontal plates 23, 25, respectively, and the three cylinders 40 used to control the clamping members 35, 36, 37. In a second embodiment, shown in FIGS. 12 and 13, the three hydraulic cylinders 40, 72 are eliminated and the movement of the two side arms 32, 34 is controlled manually by an operator. The three hydraulically controlled insert members 85 are replaced with three automatically engaging insert members 130 as shown in FIG. 12. Each insert member 130 comprises a downward extending wedge member 140 that fits into an outer sleeve member 150. Attached to the sleeve member 150 is a transversely aligned pin 152 with a cylindrical-shaped floating member 160 suspended thereover. During assembly, the floating member 160 is disposed around the pin 152 and the sleeve member 150 is disposed around the wedge member 140. Attached to the sleeve member 150 is an elongated handle 170 which enables the operator to selectively move the sleeve member 150 upward and downward over the wedge member 140.

During use, the sleeve member 150 slides downward over the wedge member 140 by gravitational forces. Simultaneously, the pin 152 on the sleeve member 150 forces the floating member 160 downward. When the floating member 160 moves downward in the sleeve member 150, it is forced outward through a side opening 154 on the sleeve member 150 to press against the inside surface of a block 12. When the lifting device 10 is lifted, the wedge member 140 is forced upward within the sleeve member 150 forcing the floating member 160 outward to securely engage the block 12. The block 12 can then be lifted.

When the lifting device 10 has positioned the block 12 in its desired location, the lifting device 10 is lowered thereby reducing the upward force exerted on the wedge member 140. The operator can then lightly tap on the elongated handle 170 thereby causing the sleeve member 150 to fall and allow the floating member 160 to move upward and disengage the side of the block 12.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

Further, the purpose of the foregoing abstract is to enable the U.S. Patent and Trademark Office personnel, patent bar practitioners, and the general public, to determine quickly from a cursory inspection the nature and essence of the technical disclosure of the application. The Abstract is neither intended to define the invention of the Application, which is measured by the claim, nor is it intended to be limiting as the scope of the invention in any way.

We claim:

1. A block lifting device, comprising:

a. a main frame member having a distal end and a proximal end;

b. a main clamping member attached to said proximal end of said main frame member;

c. means to selectively connect said main clamping member to a block;

d. at least one lateral side arm pivotally attached to said main frame member, said side arm having opposite proximal and distal ends;

e. a rotating side clamping member pivotally attached to said side arm;

f. means to selectively connect said side clamping member to a block;

g. means to rotate said side clamping member as said lateral arm is moved between a lateral, rearward extended position to a lateral, forward extended position; and, h. a lifting means for lifting said main frame member.

2. The block lifting device, as recited in claim 1, wherein said means to rotate said side clamping member is a linking arm connected to said side clamping member and said main frame member.

3. The block lifting device, as recited in claim 2, further including a stop plate attached to said side arm to limit the pivotal movement of said side arm.

4. The block lifting device, as recited in claim 2, wherein there are two side arms pivotally connected so said main frame member.

5. The block lifting device, as recited in claim 4, wherein each said side arm pivots so that said clamping members may be linearly configured.

6. The block lifting device as recited in claim 1, further including a hydraulic control means used to selectively control the movement of said main clamping member and said side clamping member.

7. The block lifting device, as recited in claim 6, wherein said hydraulic control means are hydraulic cylinders coupled to each side clamping member and connected to operate simultaneously.

8. The block lifting device, as recited in claim 1, wherein said means to connect said side clamping member is an insert member which automatically engages a hole in a block when a lifting force is applied to said insert member.

9. The block lifting device, as recited in claim 1, wherein the pivotal movement of said side arm is controlled by a hydraulic cylinder.

10. The block lifting device, as recited in claim 1, further including an attachment plate attached to each said side arm with a linking arm disposed between each said attachment plate and said main frame member enabling said attachment plate to simultaneously rotate as said adjoining side arm rotates.

11. The blocking lifting device, as recited in claim 1, wherein the lengths of said side arms and the location of said clamping members enable a set of triangularly configured blocks to be engaged.

12. A block lifting device, comprising:

a. a main frame member having a distal end and a proximal end;

b. a fixed main block clamping member attached to said proximal end of said main frame member;

c. means to selectively connect said main block clamping member to a block located below said main block clamping member;

d. two lateral side arms pivotally attached to said main frame member, said side arms having opposite proximal and distal ends;

e. a rotating side block clamping member pivotally attached to said distal end of each said side arm;

f. means to selectively connect said side block clamping member to a block located below said side block clamping member;

g. means to rotate said side block clamping members as said lateral side arms are moved between a lateral, forward extended position to a lateral, rearward extended position; and, h. a lifting means for lifting said main frame member.

13. The block lifting device, as recited in claim 12, wherein said means to rotate said side clamping members is a pair of linking arms connected to said lateral side arms and said main frame member.

14. The block lifting device as recited in claim 13, further including a hydraulic control means used to selectively control the movement of each said clamping member.

15. The block lifting device, as recited in claim 14, wherein said hydraulic control means are three separate hydraulic cylinders, each connected to one said clamping member and connected together so that they may be operated simultaneously.

16. The block lifting device, as recited in claim 15, wherein the pivotal movement of said side arms is controlled by a hydraulic cylinder.

17. The block lifting device, as recited in claim 16, wherein each said clamping member is controlled by a hydraulic cylinder.

18. The block lifting device, as recited in claim 12, further including means to automatically engage a hole in a block when a lifting force is applied to said lifting means.

19. The block lifting device, as recited in claim 18, wherein said means to automatically engage a hole in a block includes a wedge member located inside a sliding sleeve and a gripping element, said gripping element being moved between an engaged and disengaged position by the movement of said wedge member inside said sliding sleeve.

20. The block lifting device, as recited in claim 19, further including a handle attached to said sleeve to manually move said sleeve over said wedge member.

* * * * *